United States Patent [19]
Okabayashi et al.

[11] Patent Number: 5,214,413
[45] Date of Patent: May 25, 1993

[54] HEAD-UP DISPLAY APPARATUS FOR VEHICULAR DISPLAY

[75] Inventors: Shigeru Okabayashi; Junichi Fukano, both of Kanagawa; Masao Sakata, Tokyo; Tsuyoshi Todoriki, Kanagawa, all of Japan

[73] Assignee: Nissan Motor Company, Limited, Kanagawa, Japan

[21] Appl. No.: 204,237

[22] Filed: Jun. 9, 1988

[30] Foreign Application Priority Data

Jun. 23, 1987 [JP] Japan .................. 62-156222

[51] Int. Cl.⁵ .............................. G09G 3/02
[52] U.S. Cl. ................................... 340/705
[58] Field of Search ........... 340/705, 980; 358/250, 358/103; 353/14, 13; 350/174, 6.7, 6.8, 6.5; 359/630, 632

[56] References Cited

U.S. PATENT DOCUMENTS 3,915,548 10/1975 Opittek et al. .................... 340/705
4,740,780 4/1988 Brown et al. ..................... 340/705
4,808,974 2/1989 Vernay ............................. 340/705

FOREIGN PATENT DOCUMENTS

0182540 11/1982 Japan .
0180522 12/1983 Japan .
0007428 1/1984 Japan .
0005288 1/1987 Japan .
0105734 5/1987 Japan ............................. 340/705

Primary Examiner—Ulysses Weldon
Assistant Examiner—Xiao M. Wu
Attorney, Agent, or Firm—Leydig, Voit & Mayer

[57] ABSTRACT

A head-up display apparatus used as an instrument display of an automobile comprises a hologram combiner provided on the front windshield on which an image is displayed overlapping the field of view. The apparatus includes a display luminosity control system which varies the brightness of the display image gradually or delays an increase and decrease in the brightness in accordance with variations in the ambient light level so as to allow a driver's eyes to adapt to the variations.

18 Claims, 8 Drawing Sheets

HEAD-UP DISPLAY APPARATUS FOR VEHICULAR DISPLAY

BACKGROUND OF THE INVENTION

The present invention relates generally to a head-up display apparatus for an automotive vehicle for displaying information, such as vehicle speed, engine speed, fuel supply, engine coolant temperature, or so forth. More specifically, the invention relates to a display luminosity control circuit for controlling the brightness of the projected display of information on a front windshield in driver's field of view.

Such apparatus is used, for example, to provide the driver of a vehicle with a display of information which he can consult without having to divert his line-of-sight from the scene ahead of the vehicle. The head-up display includes generally a display-producing means for producing the display information instead of or in addition to a speedometer, a tachometer, a fuel gauge, a temperature gauge, or the like arranged on an instrument panel.

Japanese Patent Publication No. 57-182540 exemplifies a conventional head-up display apparatus as described above.

It is necessary for the display to compensate for the brightness of the image projected onto the windshield in accordance with variations in the foreground light level. Therefore, the brightness of the display is controlled in response to the foreground light level conditions.

In one such control system, in view of the inevitably required ON and OFF headlight switching operations due to sudden variations of foreground light level when the vehicle goes into a tunnel and comes out of it, an ON and an OFF signal of a headlamp switch is used as a detecting signal for detecting variations in the foreground light level. Thus, this system can vary the brightness of the display without imposing a burden on the driver.

In another system, a photo sensor is used, as a detecting means for detecting variations in the foreground light level, mounted above an instrument panel. The system controls the brightness of the display in accordance with a signal output by the sensor. According to the second system, the brightness of the display is varied continually in accordance with variations in the ambient light level without imposing a burden on the driver.

In the above described first and second systems, the detecting methods for detecting variations in the ambient light level differ. These systems, however, control the brightness level of the display in response to the detecting signal for indicating variations in the ambient light level.

However, the above control systems vary the brightness of the display immediately in response to variations in the foreground light level conditions. The following problems are encountered.

When an automobile goes into a tunnel in the daytime, a conventional control system reduces the brightness of the display in response to darkness in the tunnel. The driver's eyes, however, do not adapt to the reduced brightness of the image immediately, so that the displayed information cannot be visibly identified until the driver's eyes adjust.

When the automobile comes out of the tunnel, the system increases the brightness of the display in response to the foreground light level. The driver's eyes, however, cannot adapt to the increased brightness of the display immediately. The display is, therefore, momentarily too bright and dazzling.

SUMMARY OF THE INVENTION

Therefore, it is an object of the present invention to provide an improved head-up display apparatus including means for projecting a display image of information onto a windshield of a vehicle, and means for controlling brightness of the display image of information in accordance with variations in the ambient light level so as to allow the observer's eyes to adapt to the variations of light level.

In order to accomplish the aforementioned and other objects, a head-up display system, according to the invention, employs a hologram combiner attached to the windshield of a vehicle, display means for projecting a display image onto the combiner, and a brightness controller for adjusting the light intensity of display image.

According to one aspect of the invention there is provided a display apparatus including a hologram combiner, a detector for providing a detector signal representative of environmental light conditions which detector signal is variable between a first value indicative of a first ambient light level and a second value indicative of a second ambient light level different from the first level, means, including a light source means, for projecting a display image of information onto the combiner, and control means, associated with the light source means, for adjusting the intensity of light to be generated by the light source means on the basis of the detector signal, the control means being responsive to the detector signal which varies signal level from the first value to the second value, to adjust the light intensity from a first intensity corresponding to the first ambient light level to a second intensity corresponding to the second ambient light level with a given lag time.

According to another aspect of the invention, there is provided a head-up display comprising a hologram combiner, display means, comprising a light source, for projecting a display image of information onto the combiner, a detector for providing a detector signal representative of ambient light conditions, and a controller, associated with the light source, for adjusting the brightness of the display image in accordance with the detector signal so as to vary after a predetermined period of time in response to the signal.

According to further aspect of the invention there is provided a display apparatus including a hologram combiner attached to the windshield of the vehicle, a detector for providing a detector signal representative of the ambient light level which indicates a first light level and a second light level different from said first light level, a laser beam source for generating a scanning beam which irradiates the combiner to produce a display image, scanning means for scanning the scanning beam across the hologram combiner in accordance with a predetermined pattern, and a controller, associated with the laser beam source, for adjusting the brightness of the scanning beam between the first and second light levels, the controller controlling brightness of the display image with a given lag time in response to the detector signal.

DESCRIPTION OF THE PREFERRED EMBODIMENT

Figure 1:
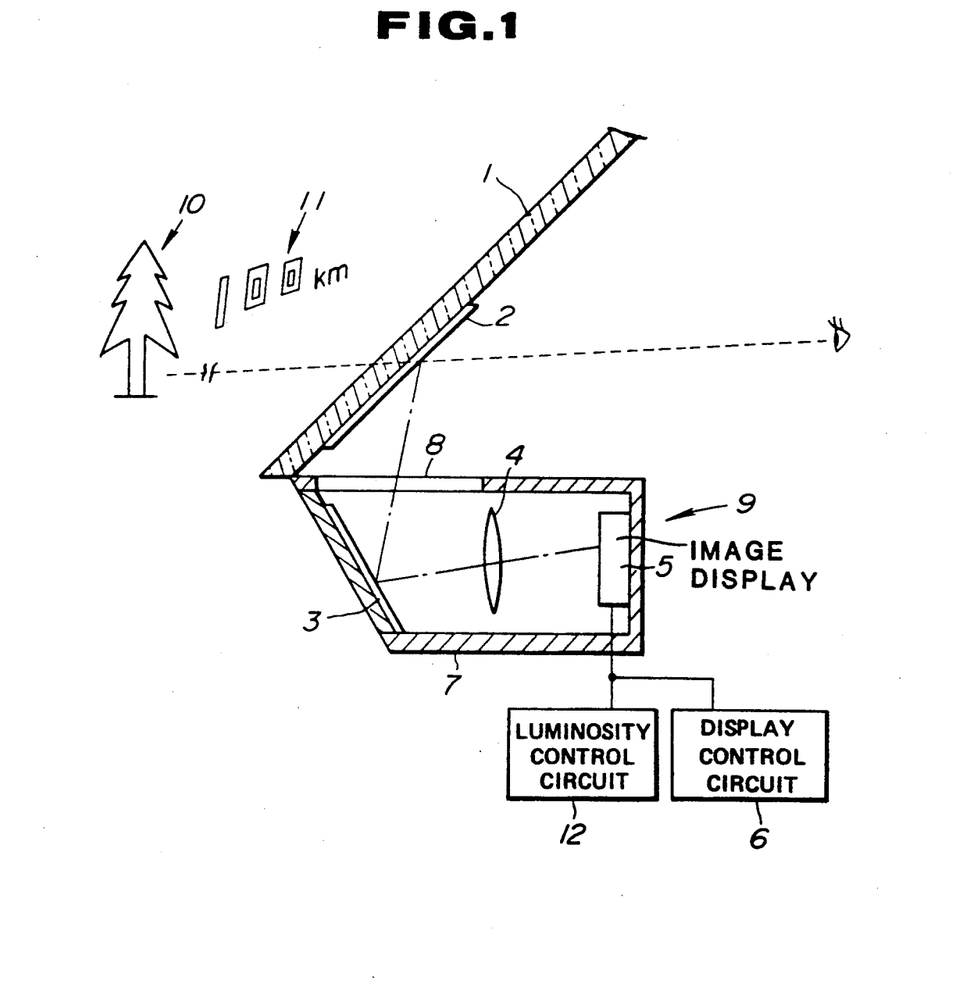
FIG. 1 is a schematic illustration which shows a head-up display apparatus.

Referring now to FIG. 1, wherein like numbers refer to like parts in the several views, there is provided a head-up display system, which includes a hologram combiner 2 attached to a windshield 1. The combiner 2 generally consists of a pair of transparent glass plates between which a hologram is sandwiched. The hologram combiner 2 reflects light of a predetermined wavelength which corresponds to the wavelength of light projected from an image projecting device 9. Other visible light frequencies, however, are transmitted, unattenuated through the combiner 2 and thus the driver can see the exterior scene 10 without interference. An image projecting device 9 comprises a lens 4 and a plane mirror 3 housed within a space defined within a box-shaped projector housing 7. The housing has a transparent window 8. The image projecting device 9 further includes an image display 5 which may comprise a fluorescent character display tube, an electroluminescent element, a cathode-ray tube, or so forth. The projector housing 7 is mounted on a dashboard. A display luminosity control curcuit 12 and a display control circuit 6 are provided for the image projecting device, which are electrically connected to the image display 5. The display luminosity control circuit 12 adjusts the brightness of the display image so that the driver can easily see the display image 11 in his line-of-sight against the background of the scene without it being too dim or too bright. The display control circuit controls driving information displayed on the image display 5 such as vehicle speed, engine speed, engine coolant temperature or engine temperature, remaining fuel supply, or so forth. The image of driving information displayed by the image display 5 on the basis of a signal from the display control circuit 6 is propagated through a lens 4 to the plane mirror 3 and then reflected thereby onto the hologram combiner 2. It will be appreciated that the display image 11 of information appears in the line-of-sight of a driver against a background of the scene 10 visible through the windshield 1 of the vehicle and the nature of the hologram is such that it appears to be distant from the viewer. Therefore, the driver can consult the display of information without having to divert his line-of-sight from the scene 10 ahead of the vehicle, and he may shift his attention from the display to the scene 10 and back without any need for refocussing of his eyes.

The head-up display system using a CRT has been disclosed in detail in the Japanese Utility Model Publications No. 58-180522 and No. 59-7428. The contents of the publications are hereby incorporated by reference.

Figure 2:
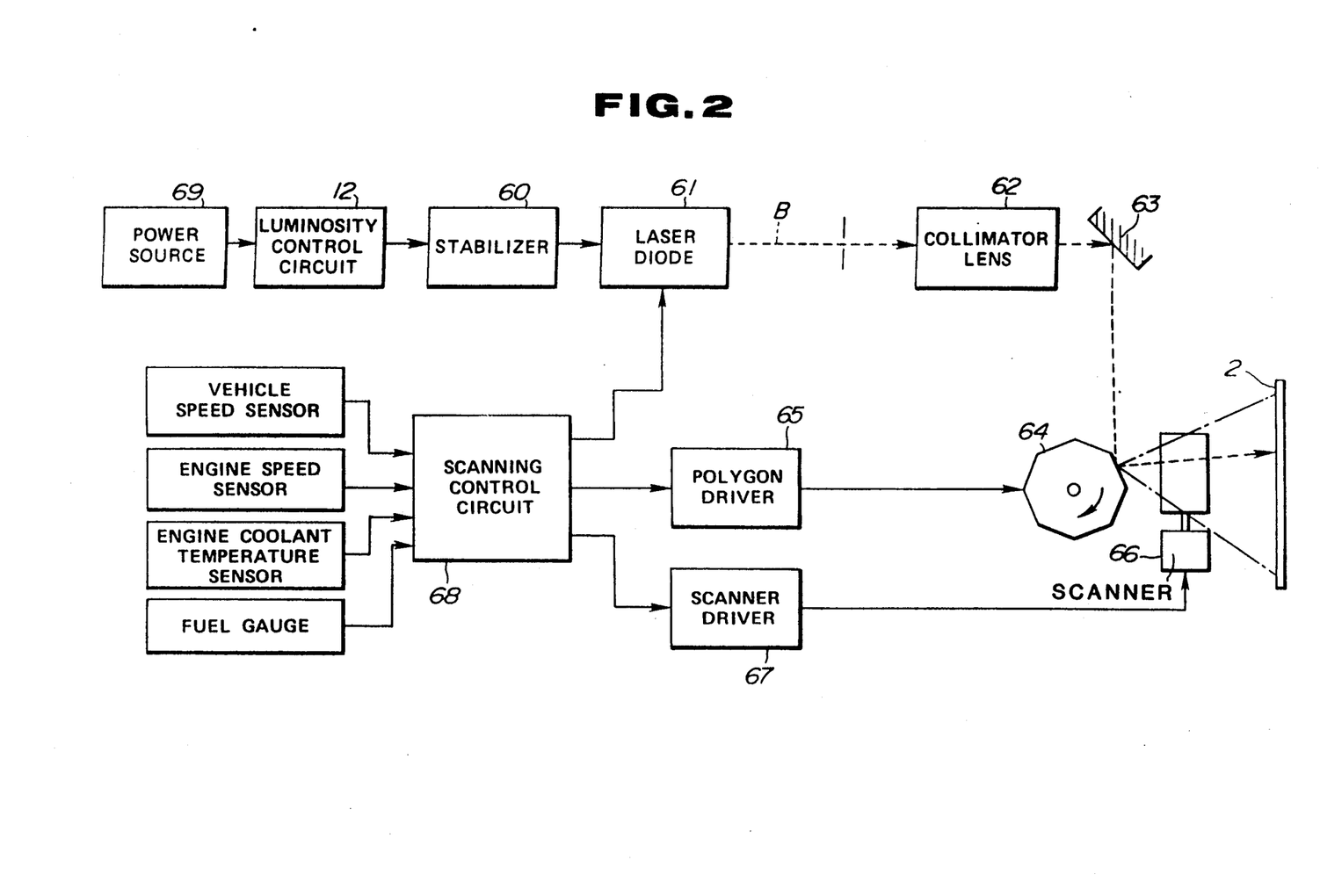
FIG. 2 is a block diagram which shows a head-up display apparatus using a scanning control circuit for a scanning laser beam.

FIG. 2 shows another form of the image projecting device which employs laser beam scanner. The image projecting device comprises a laser diode 61 serving as the source of a scanning beam B. The laser diode 61 is connected to a power source 69 through a luminosity control circuit 12 and a stabilizer 60. The laser diode 61 transmits the scanning beam B to a deflector 63 through a collimator lens 62. The deflector 63 deflects the scanning beam B by about 90 degrees toward a polygonal deflector 64. The polygonal deflector 64 rotates at high speed to scan the scanning beam in the vertical direction on a hologram combiner 2. The polygonal deflector 64 is connected to a polygon driver 65 which controls scanning speed and scanning direction. A oscillation scanner 66 is interposed between the polygon deflector 64 and the hologram combiner 2. The oscillation scanner 66 is controlled by a scanner driver 67 and scans the scanning beam B in the horizontal direction. An acousto-optic modulator may be used as a replacement for the polygon deflector for acousto-optically deflecting the laser beam.

A scanning control circuit 68 receives signals representative of driving information from a vehicle speed sensor, an engine speed sensor, an engine coolant temperature sensor, a fuel gauge, or the like. Based on the sensor signals, the scanning control circuit 68 derives a display image pattern and provides control signals to the laser diode 61, the polygon driver 65, and the scanner driver 67. The control signal for the laser diode 61 is a modulated binary signal containing display data, such as vehicle speed, engine speed, engine coolant temperature, fuel supply, or the like. The control signal turns the laser diode 61 ON at scanning points making up images to be displayed. The scanning position of the laser beam B is controlled by the polygon deflector 64 and the oscillation scanner 66 in accordance with control signals applied from the scanning control circuit 68. Similar to the head-up display system shown in FIG. 1, it will be noted that the display image can appear in the line-of-sight of the driver against background of the scene visible though the windshield.

The head-up display system using laser beam scanner has been disclosed in detail in Japanese Published Patent Application No. 60-142434. The contents of that Publication are hereby incorporated by reference.

Figure 3:
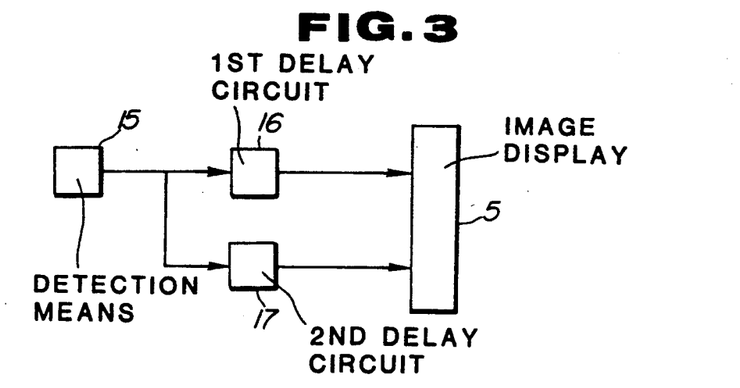
FIG. 3 is a schematic illustration which shows a delay circuit of this invention.

Referring to FIG. 3, there is provided a display luminosity control system according to the invention. The display luminosity control system comprises detection means 15 for providing a signal representative of brightness of the forward field of view, a first delay circuit 16, a second delay circuit 17, and an image display 5 provided for a head-up display system. The first delay circuit 16 delays the increase in brightness of an image displayed by the image display 5 when an ambient light level of the vehicle is increased. The second delay circuit 17 delays the reduction of brightness of the image when the ambient light level is decreased. These delay circuits will be described in detail hereinbelow.

Figure 4:
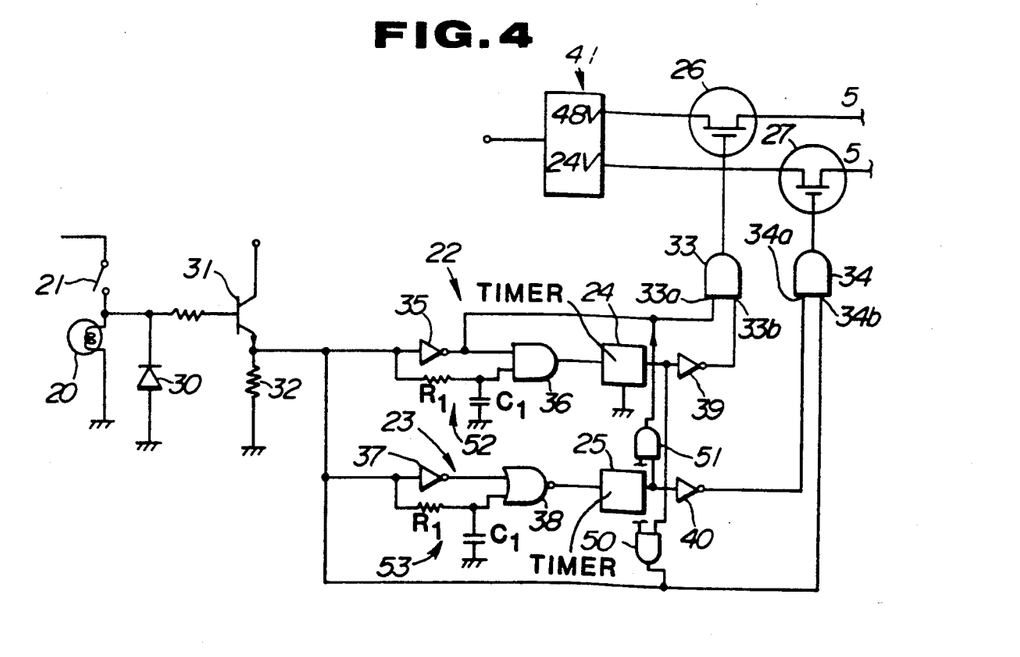
FIG. 4 is a circuit diagram of the first embodiment of this invention.

FIG. 4 shows a first embodiment of the above described display luminosity control system according to the invention, which uses "ON" and "OFF" signals produced by the light switch of the headlamps as detection means 15, shown in FIG. 3, for providing a signal representative of the brightness or darkness of the forward field of view through the front windshield of the vehicle. The display luminosity control circuit of the head-up display apparatus includes the light switch 21 of a headlamp 20. The function of the light switch 21 is such that when the ambient light level becomes reduced and the switch 21 is closed, the headlamp 20 illuminates the forward field of view, and when the forward field of view becomes bright, the light switch 21 may be opened so as to turn the headlamp 21 off. A diode 30 is connected in parallel with the headlamp 20 between the switch 21 and ground.

In this circuit, upon the closing the light switch 21, a transistor 31 comes conductive, providing a signal representative of a logical "1" across a loading resistor 32. When the light switch 21 is in the off state, the signal is "0".

The first delay circuit 16 is responsive to output voltage representive of a "0" signal or a "1" signal output from the transistor 31. A falling edge of the output voltage is detected by a falling-edge detecting circuit 22, which comprises an inverter 35, an integrating circuit 52 including a resistor $R_1$ and a capacitor $C_1$, an AND circuit 36, and a timer 24.

Figure 5:
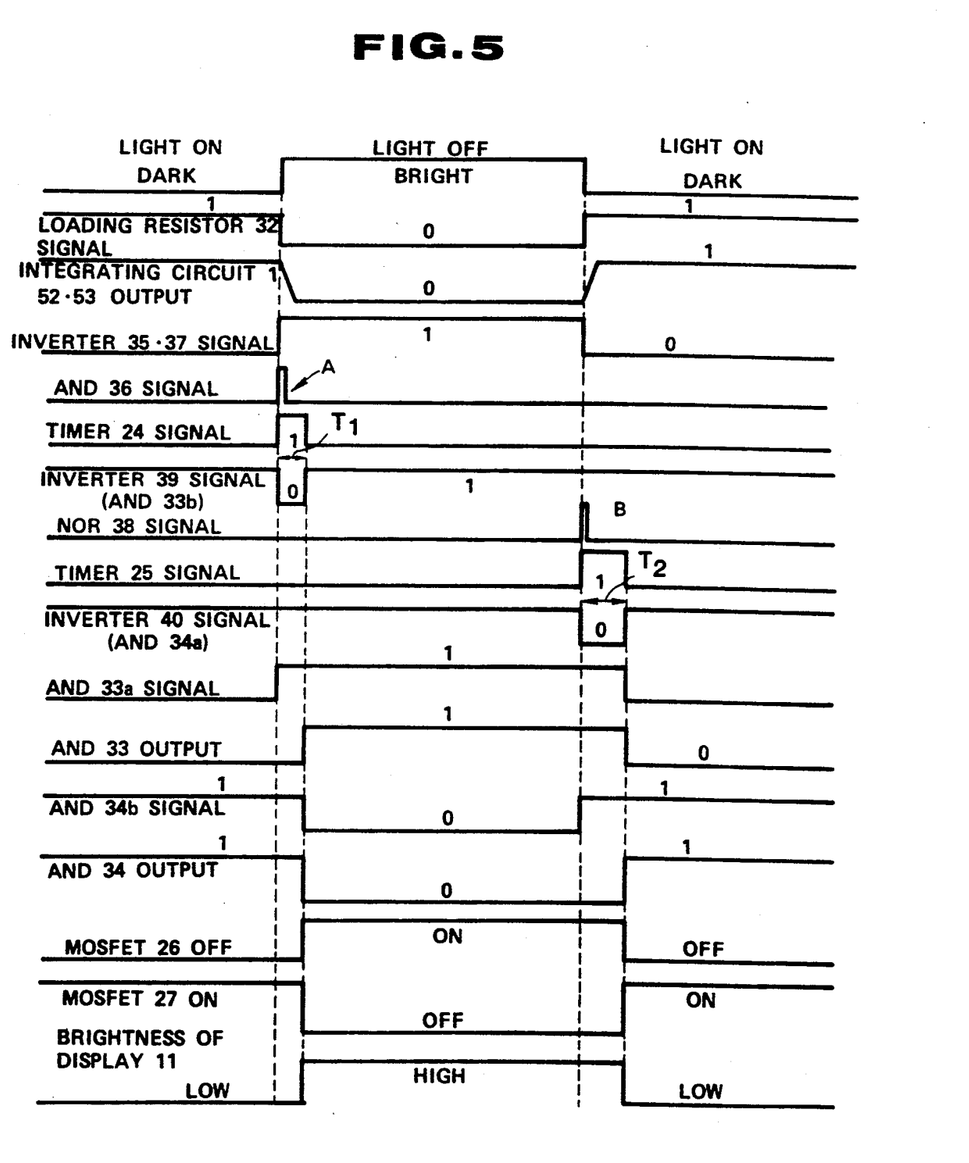
FIG. 5 is a time chart of operation of the circuit as shown in FIG. 4.

As can be seen FIG. 5, when the switch 21 is opened in response to an increase in the ambient light level, the signal output of the transistor 31 turns from "1" to "0", and the signal output of the integrating circuit 52 turns from "1" into "0". At the same time, the signal of the inverter 35 goes from "0" to "1".

The AND circuit 36 receives the integrated output signal of the integrating circuit 52 and the output signal of the inverter 35. When these signals which are input into the circuit 36 are "1", respectively, the circuit 36 provides an output signal to the timer 24 which functions as a falling edge-detection pulse A, as shown in FIG. 5, produced by a falling edge of the signal of the transistor 31. The timer 24 provides an output "1" signal during the delay time $T_1$ (30 seconds to 60 seconds) in response to the falling edge-detection pulse A. The inverter 35 provides an input signal to an input terminal 33a of the AND circuit 33, while the timer 24 provides a signal to the inverter 39 and a terminal of a AND circuit 50. At this time, another terminal of the circuit 50 has a "1" signal. The detailed description of the circuit 50 will be given later.

The inverter 39 provides an input "0" signal to an input terminal 33b of the AND circuit 33 while the signal of the timer 24 is "1". When the signals of the terminals 33a and 33b are "1" respectively, the AND circuit 33 provides an input "1" signal to a MOSFET 26. The MOSFET 26 is electrically connected to the 48 volt power supply side of a DC/DC converter 41 and is turned on in response to the output "1" signal from the AND circuit 33. The light switch 21 of the vehicle is turned off in response to an increase in ambient light level, so that the signal of the inverter 35 is varied from "0" to "1". A "1" signal is, therefore, applied to the input terminal 33a of the AND circuit 33, while a "0" signal is input into the input terminal 33b of the circuit 33 from the inverter 39 during delay time $T_1$. As a result, the AND circuit 33 provides an output "1" signal after delay time $T_1$ and thus the MOSFET 26 is turned on after delay time $T_1$.

The second delay circuit 17 is actuated in accordance with a change in the output voltage of the transistor 31 in the same way as the first delay circuit 16 except that it detects a rising edge of the output voltage by means of a rising-edge detecting circuit 23. The rising-edge detector 23, as shown in FIG. 4, includes an inverter 37, an integrating circuit 53, a NOR circuit 38, and a timer 25.

As can be seen in FIG. 5, when the light switch 21 is turned off in response to the ambient light level increasing, the signal variation from "1" to "0" of the transistor 31 and the resistor 32 causes an output signal of the integrating circuit 53 to change from "1" to "0" and the signal output of the inverter 37 goes from "0" to "1". The NOR circuit 38 provides no signal output, as a rising edge-detection pulse B produced by a rising edge of the signal of the transistor 31, to the timer 25.

The NOR circuit 38 receives the signal from the integrating circuit 53 and that from the inverter 37. The circuit 38 outputs the rising edge-detection pulse to the timer 25 when "0" signals are received at both input terminals thereof simultaneously. When the light switch 21 is turned off, the signal output by the integrating circuit 53 changes from "1" to "0" after the signal variation from "1" to "0" of the inverter 37 so that the circuit 38 provides no signal output to the timer 25.

Turning on the light switch 21, the signal output of the transistor 31 turns from "0" to "1", which, in turn, causes the signal of the integrating circuit 53 to gradually change from "0" to "1". The signals of the inverter 35 and 37 change from "1" to "0" when the signal of the transistor 31 changes from "0" to "1".

Therefore, when the light switch 21 is turned on, the inverter 37 outputs a "0" signal to the NOR circuit 38 and the integrating circuit 53 gradually changes from "0" to "1". In other words, both inputs of the NOR circuit 38 become zero before the integrating circuit 52 outputs a "1" signal. As a result of this, the NOR circuit is caused to output the rising edge-detection pulse B to the timer 25. The timer 25 provides a "1" output signal during delay time $T_2$ (60 seconds to 3 minutes) upon receiving the rising edge-detected signal. The timer 25 provides output signals to the inverter 40 and a terminal of the AND circuit 51 respectively. The circuit 51 has a "1" input signal at another terminal. The function of the circuits 50 and 51 will be described later.

The inverter 40 provides a "1" signal to the input terminal 34a of the AND circuit 34 while the signal of the timer is in the "0" state. At the same time, the input terminal 34b of the circuit 34 receives the signals output by the transistor 31. When signals at both the terminals 34a and 34b are "1" respectively, the AND circuit 34 provides an input "1" signal to a MOSFET 27. The MOSFET 27 is electrically connected to the 24 volt power supply of a DC/DC converter 41 and is turned on by an output "1" signal from the AND circuit 34. When the light switch 21 is turned off, the output of the transistor 31 changes from "0" to "1". A "1" signal is, therefore, applied to the input terminal 34b of the AND circuit 34 and a "0" signal is applied to the terminal 34a of the AND circuit 34 from the inverter 40 during delay time $T_2$. As a result, the AND circuit 34 provides an output "0" signal during delay time $T_2$ and thereafter outputs a "1" signal by which the MOSFET 27 is turned on.

Since a "1" signal is applied to the input terminal 33a of the AND circuit 33 via the AND circuit 51 during delay time $T_2$, the AND circuit 33 provides a "1" signal to the MOSFET 26 during $T_2$ regardless of what signal is output by the inverter 35 while the light switch 21 is on state and thus the MOSFET 26 is turned off after delay time $T_2$. When the lighting switch 21 is turned off, the signal that the loading resistor 32 applies to the input terminal 34b of the AND circuit 34 is changed from "1" into "0". The input terminal 34b of the AND circuit 34, however receives a "1" signal from the timer 24 via the AND circuit 50 during delay time $T_1$. Thus, even if the signal output by the loading resistor 32 goes from "1" into "0" due to turning off of the light switch 21, the AND circuit 34 applies "1" signal to the MOSFET 27 during delay time $t_1$. The MOSFET 27 is turned off after delay time $T_1$.

This system will be further described with reference to FIG. 5.

When the light is turned off, the signal at the loading resistor 32 changes from "1" into "0". The signal output by the integrating circuits 52 and 53 changes from "1" to "0" gradually due to the resistors $R_1$ and the capacitors $C_1$. Signals output from the inverters 35 and 37 change from "0" to "1". The output from the AND circuit 36 changes from "0" to "1" for a moment due to slow signal changing of the integrating circuit 52. The timer 24 outputs a "1" signal during delay time $T_1$, thereby causing the inverter 39 to output a "0" signal during the delay time $T_1$. The NOR circuit 38 and the timer 25 continue to output "0" signals, and thus the inverter 40 continues to output a "1" signal. The NOR circuit 38, however, changes from "0" to "1" for a moment when the lights are turned on. The timer 25 changes from "0" to "1" during a delay time $T_2$, thereby causing the signal output from the inverter 40 to change from "1" to "0" during time $T_2$. In the AND circuit 33, when the lights are turned off, a "1" signal is received at the terminal 33a from the AND circuit 51 and thus the output of the AND 33 changes from "0" to "1" after delay time $T_1$. The signal at the terminal 34b is maintained "1" until delay time $T_1$ expires by a "1" signal fed from the AND circuit 50 and goes from "1" to "0" after delay time $T_1$. Thus, a signal output from the AND circuit 34 goes from "1" to "0" after delay time $T_1$ expires, thereby turning on the MOSFET 26, while the MOSFET 27 is turned off. This causes the brightness of the display to be varied in accordance with variations in the foreground light level as indicated by the light switch.

Therefore, according to this control system, variation of power supply to the display between 24 and 48 volts occurs after a delay period designed to allow a driver's eyes time to adjust to changed lighting conditions.

Figure 6:
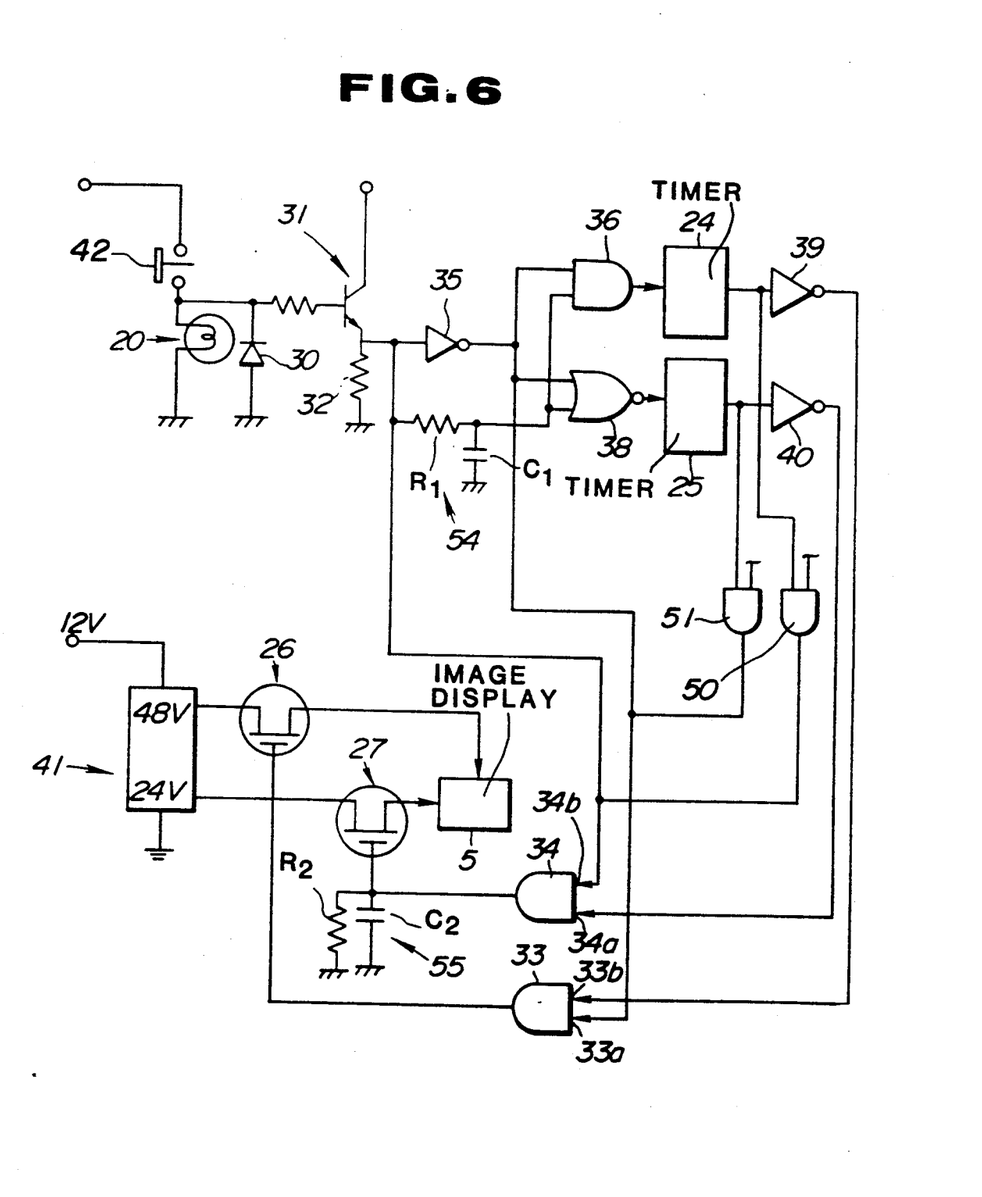
FIG. 6 is a circuit diagram of the second embodiment of this invention.
Figure 7:
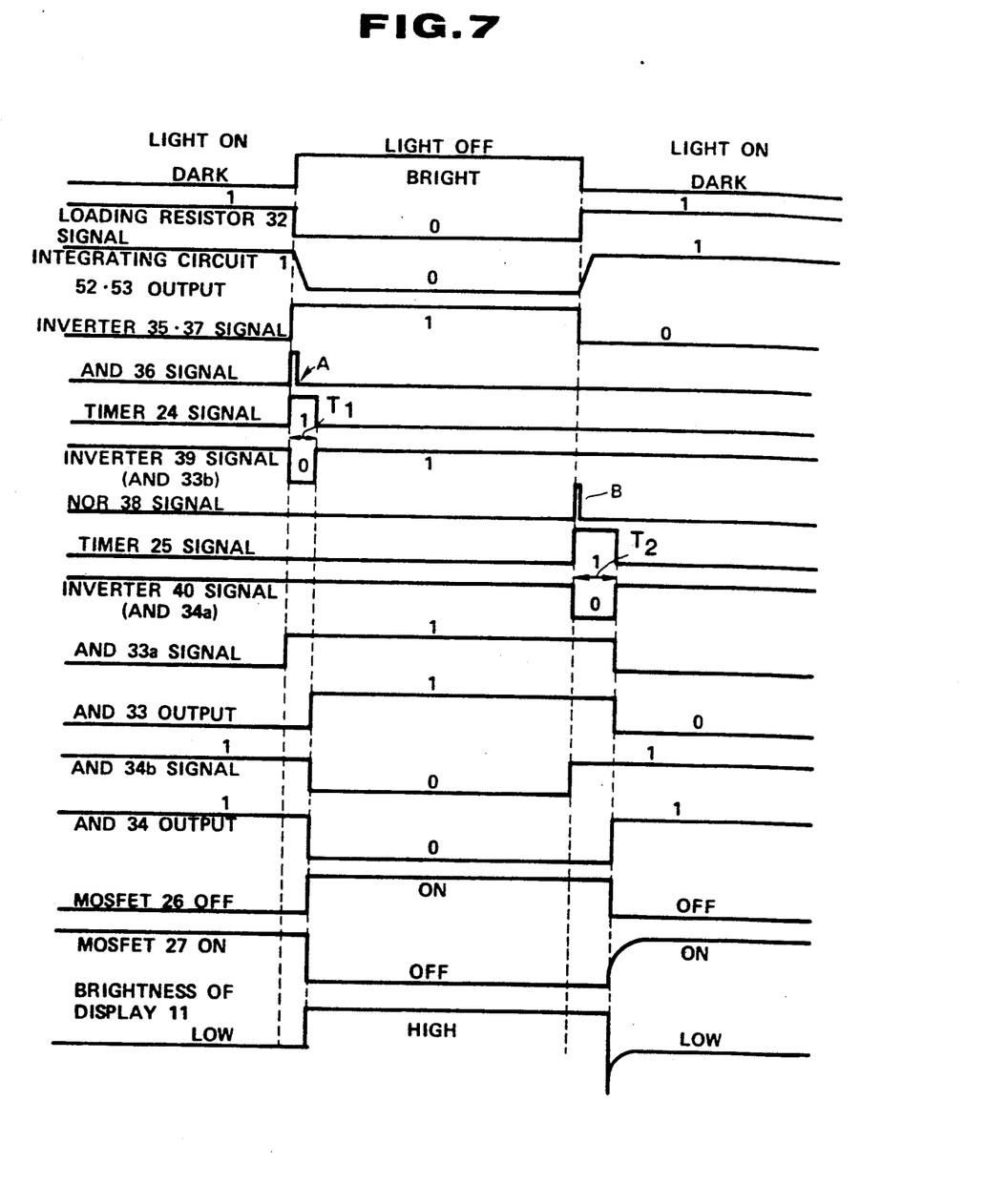
FIG. 7 is a time chart of operation of the circuit as shown in FIG. 6.

A second embodiment will be described hereinbelow. Referring to FIG. 6, the display luminosity control system according to the invention has a photo sensor (luminance sensor) 42, mounted on upper side of an instrument panel, the upper side of the windshield, or so forth, for detecting variations in the ambient light conditions in front of a vehicle. While the system has two integrating circuits similarly to the first embodiment, one circuit 54 comprising a resistor $R_1$ and a capacitor $C_1$ is provided for the AND circuit 36 and the NOR circuit 38, and another circuit 55 having a resistor $R_2$ and capacitor $C_2$ is arranged between the output side of an AND circuit 34 and the MOSFET 27. Due to the presence of the integrating circuit 55, the MOSFET 27 increases the power to the image display slowly as shown in FIG. 7 so as to allow the driver's eyes time to adapt to darkness when the light level decreases. Other aspects are similar to the first embodiment of the invention. The detailed description of this system will be, therefore, omitted.

Figure 8:
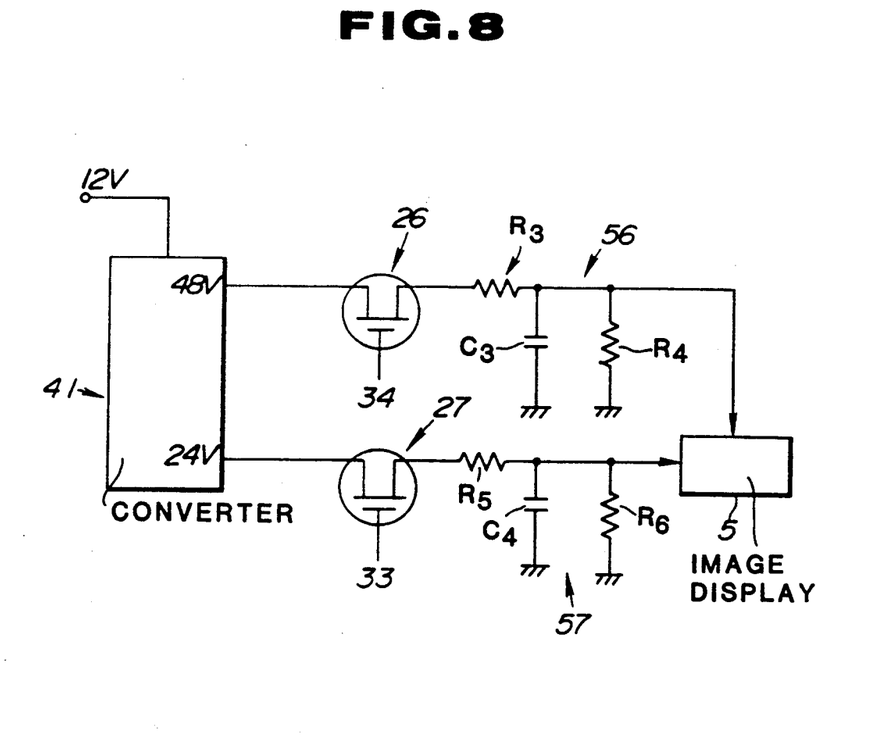
FIG. 8 is a circuit diagram of the third embodiment of this invention.
Figure 9:
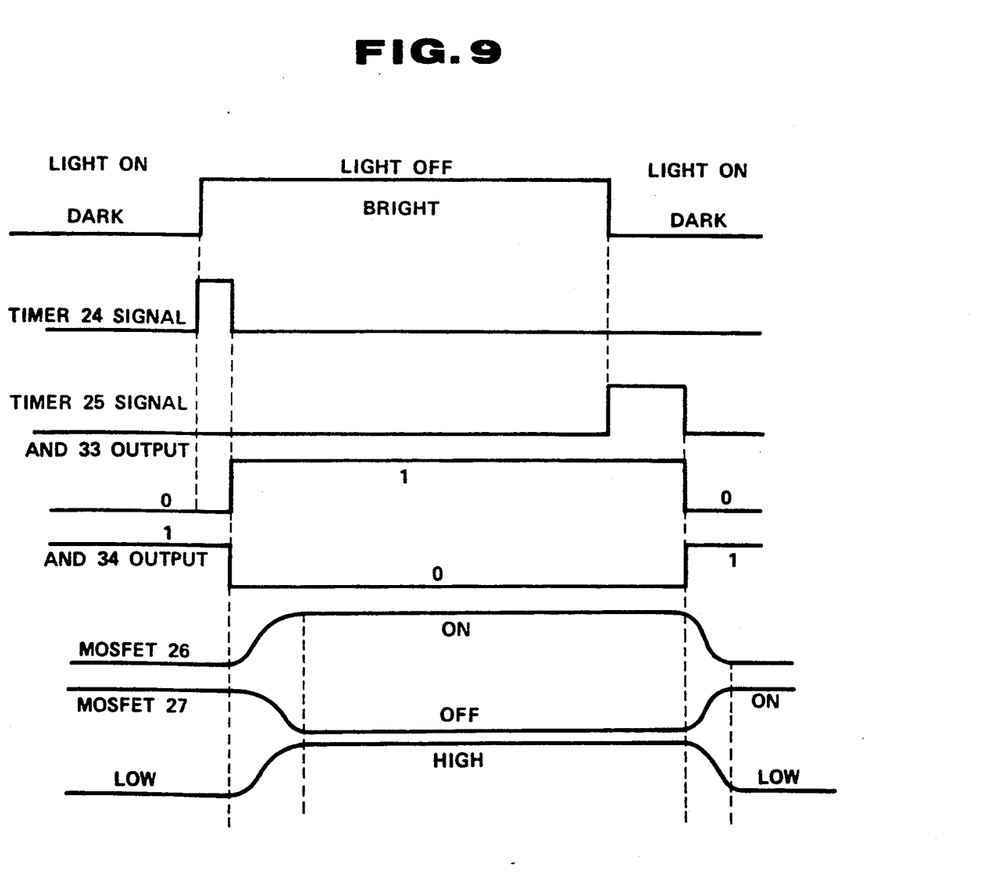
FIG. 9 is a time chart of operation of the circuit as shown in FIG. 8.

A third embodiment of the display luminosity control system will be described hereinbelow. Referring to FIG. 8, the system comprises integrating circuits 56 and 57. The integrating circuit 56 comprises resistors $R_3$ and $R_4$, and a capacitor $C_3$ and is arranged at the output side of a MOSFET 26. The integrating circuit 57 includes a resistor $R_5$ and $R_6$, and capacitor $C_4$ and is arranged at the output side of a MOSFET 27. It will be appreciated that, as shown in FIG. 9, the MOSFET 26 and the MOSFET 27 decrease and increase the display voltage gradually so that the driver's eyes have time to adapt to variations in the ambient light level. Other aspects are similar to the first embodiment of the invention. The detailed description of this system will therefore be omitted.

What is claimed is:

1. A head-up display apparatus for a vehicle comprising:
   a hologram combiner;
   a detector for providing a detector signal representative of ambient light level and variable between a first value indicative of a first ambient light level and a second value indicative of a second ambient light level different from said first level;
   projecting means, including a light source for generating light, for projecting a display image of information onto said combiner; and
   control means, associated with said light source, for maintaining an intensity of light generated by said light source at a first intensity corresponding to said first ambient light level for a first delay time measured from a change in said detector signal from said first value to said second and for changing the intensity of light generated by said light source from said first intensity to a second intensity corresponding to said second ambient light level when said first delay time has elapsed, said first delay time being sufficiently long to enable human eyes viewing the display image to adjust to the change in the ambient light level.

2. An apparatus as set forth in claim 1, wherein said control means includes means for maintaining the intensity of light generated by said light source at said second intensity for a second delay time measured from a change in said detector signal from said second value to said first value and changing the intensity of light generated by said light source from said second intensity to said first intensity when said second delay time has elapsed, said second delay time being sufficiently long to enable human eyes viewing the display image to adjust to the change in the ambient light level from said second ambient light level to said first ambient light level.

3. An apparatus as set forth in claim 2, wherein said control means comprises a first delay circuit establishing said first delay time and a second delay circuit establishing said second delay time.

4. An apparatus as set forth in claim 1, wherein said detector is a headlamp switch for a vehicle.

5. An apparatus as set forth in claim 1, wherein said detector is a sensor for detecting variation in ambient light conditions.

6. A head-up display apparatus as set forth in claim 2 wherein
   said control means comprises an integrating circuit for gradually changing the light intensity of the display image between said first and second intensity levels over a predetermined period of time.

7. An apparatus as set forth in claim 1, wherein said first delay time is at least 30 seconds.

8. An apparatus as set forth in claim 7 wherein said first delay time is 30 seconds to 60 seconds when the first ambient light level is lower than the second ambient light level and is 60 to 180 seconds when the first ambient light level is greater than the second ambient light level.

9. An apparatus as set forth in claim 2 wherein:
the first ambient light level is greater than the second ambient light level;
the first delay time is 30 to 60 seconds; and
the second delay time is 60 to 180 seconds.

10. A head-up display apparatus for a vehicle comprising:
a hologram combiner;
display means, including a light source, for projecting a display image of information onto said combiner;
a detector for providing a detector signal representative of ambient light level; and
a controller, associated with said light source, for maintaining the brightness of the display image for a predetermined period of time following a change in said detector signal due to a change in the ambient light level to allow human eyes viewing the display image to adjust to the change in ambient light and for adjusting the brightness of said display image in accordance with said detector signal after said predetermined period of time has elapsed.

11. An apparatus as set forth in claim 10, wherein said detector is a sensor for detecting variation in the ambient light.

12. An apparatus as set forth in claim 11, wherein said controller controls the brightness of the display image in accordance with ambient light level detected by said sensor.

13. A head-up display apparatus for a vehicle comprising:
a hologram combiner attached to a vehicle windshield;
a detector for providing a detector signal which is representative of the ambient light level and which indicates a first light level and a second light level different from said first light level;
a laser beam source for generating a scanning beam which irradiates said combiner to produce a display image;
scanning means for scanning beam across said hologram combiner in accordance with a predetermined pattern; and
a controller, associated with said laser beam source, for adjusting the brightness of said scanning beam and thereby varying the brightness of said display image in response to said detector signal with a sufficiently long lag time to allow human eyes viewing the display image to adjust to changes in the ambient light level.

14. A head-up display apparatus as set forth in claim 13 wherein
said controller includes an integrating circuit for slowly changing the brightness of said display image between first and second light levels over a predetermined period of time.

15. A head-up display apparatus for a vehicle comprising:
a hologram combiner;
a detector for generating a detector signal representative of ambient light level, the detector signal having a first value indicative of a first ambient light level and a second value indicative of a second ambient light level greater than the first ambient light level;
a display for projecting an image onto the combiner;
a delay circuit for generating a signal at the elapse of a delay time from a change in the detector signal between the first and second values; and
control means responsive to the signal generated by the delay circuit for maintaining the intensity of the image projected by the display at a first intensity following a change in the value of the detector signal between the first and second values until said delay time has elapsed and then changing the intensity of the image projected by the display between the first intensity and a second intensity.

16. An apparatus as set forth in claim 15 wherein the delay time has a first duration when the detector signal changes from the first to the second value and a second duration which is greater than or equal to the first duration when the detector signal changes from the second to the first value.

17. An apparatus as set forth in claim 16 wherein the first duration is 30 to 60 seconds and the second duration is 60 to 180 seconds.

18. An apparatus as set forth in claim 15 wherein the delay time is sufficiently long to allow human eyes viewing the display to adjust to a change between the first and second ambient light levels.

* * * * *

UNITED STATES PATENT AND TRADEMARK OFFICE
CERTIFICATE OF CORRECTION

PATENT NO. : 5,214,413

DATED : May 25, 1993

INVENTOR(S) : Okabayashi et al.

It is certified that error appears in the above-identified patent and that said Letters Patent is hereby corrected as shown below:

Claim 1, col. 8, line 33, after "second" insert --value--.

Claim 13, col. 10, line 1, after "scanning" (second occurrence) insert --said scanning--.

Signed and Sealed this

Eighteenth Day of January, 1994

Attest:

BRUCE LEHMAN

Attesting Officer        Commissioner of Patents and Trademarks